United States Patent [19]

Smith

[11] Patent Number: 4,986,649

[45] Date of Patent: Jan. 22, 1991

[54] EYEGLASSES FRAME WITH IMPROVED FRONTAL SUPPORT

[75] Inventor: Lonnie W. Smith, Orange, Calif.

[73] Assignee: Robert E. Strauss, Santa Ana, Calif.

[21] Appl. No.: 255,476

[22] Filed: Oct. 11, 1988

[51] Int. Cl.[5] ............................................. G02C 5/02
[52] U.S. Cl. ..................................... 351/130; 351/158
[58] Field of Search ................... 351/130, 94, 91, 158, 351/132

[56] References Cited

U.S. PATENT DOCUMENTS 2,547,467  4/1951  Hurst .................................. 351/130

Primary Examiner—Paul M. Dzierzynski
Attorney, Agent, or Firm—Plante, Strauss, Vanderburgh & Connors

[57] ABSTRACT

An eyeglass structure having frame means interconnecting left and right ocular frames to support respective ocular lenses with upper frame edges and with laterally supported and pivotally attached temples. The improvement in the frontal support comprises at least one support post extending upwardly and rearwardly from the eyeglass structure. A frontal support member is carried on the upper end of the support post and is the only frontal support to carry the weight of the eyeglass structure.

6 Claims, 2 Drawing Sheets

EYEGLASSES FRAME WITH IMPROVED FRONTAL SUPPORT

BACKGROUND OF INVENTION

1. Field of the Invention

This invention relates to a frame for eyeglasses and, in particular, to a frame for eyeglasses having an improved frontal support.

2. Brief Statement of the Prior Art

The structural design of frames for eyeglasses has remained virtually unchanged for centuries. The traditional binocular support frame has individual ocular frames which support each of the right and left lenses. The ocular frames are joined together medially usually with a bow that supports a bridge that rests on the nose of the wearer. At its lateral extremes, the binocular frame pivotally supports right and left temples which extend towards the rear of the head, resting on the wearer's ears.

A common difficulty experienced with this traditional frame is the tendency for the eyeglasses to slip downwardly on the nose, requiring frequent readjustment. This tendency becomes more pronounced with highly corrective and massive lenses. Some attempts have been made to eliminate or reduce this tendency of eyeglasses to slide down the wearers nose. Shortening of the temples to place more compression between the nose bridge and the nose causes discomfort and creates indentations or blemishes on the wearer's nose. The weight of the lenses has been reduced by using plastics such as polycarbonates and polymethylmethacrylate lenses. Plastic lenses, however, have a greater tendency to scratch and acquire surface blemishes.

Soft adhesive pads have been placed on the nose bridge of the eyeglasses to also reduce the tendency of the glasses to slip and reduce the discomfort of the glasses to the wearer. This approach however only partially alleviates the shortcomings of the design and does not eliminate the problem.

BRIEF DESCRIPTION OF THE INVENTION

This invention is a frame for eyeglasses having an improved frontal support. The frontal support is a super structure located on the binocular frame of eyeglasses and extending upwardly and rearwardly of the upper bow or crossbar of the binocular frame. The superstructure has a support pad that rests against the wearer's forehead, immediately above the wearer's brow, thereby utilizing the wearer's brow as a protuberance to support the weight of the eyeglasses.

The improved frontal support provides definite advantages over the conventional nose bridge of eyeglass frames. The frontal support of this invention has no tendency to slip and release the glasses. Instead, the glasses remain anchored firmly in place even with strenuous head movements and activity.

BRIEF DESCRIPTION OF THE DRAWINGS

The invention will be described with reference to the drawings of which.

DESCRIPTION OF PREFERRED EMBODIMENTS

Figure 1:
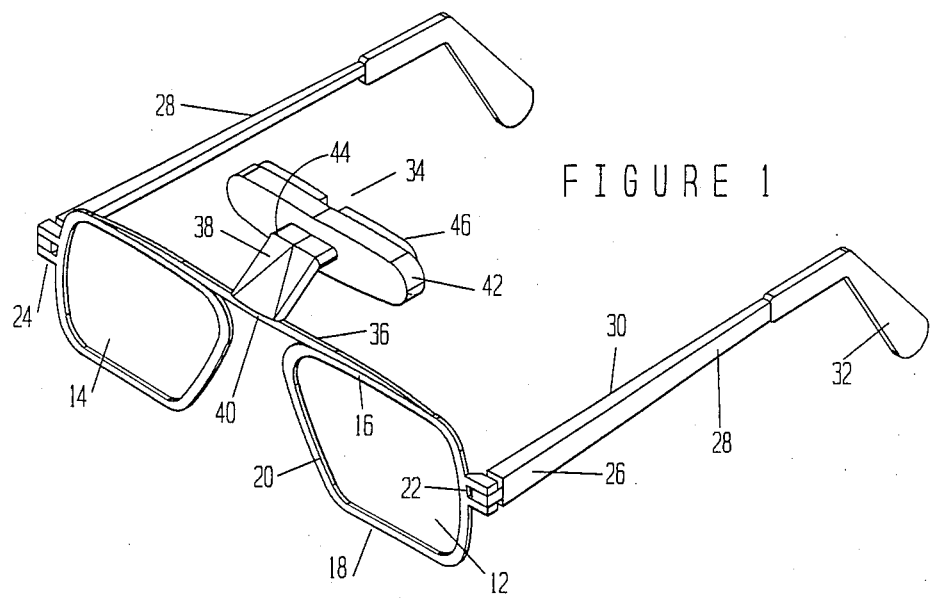
FIG. 1 is a prospective view of the eyeglasses of the invention.
Figure 2:
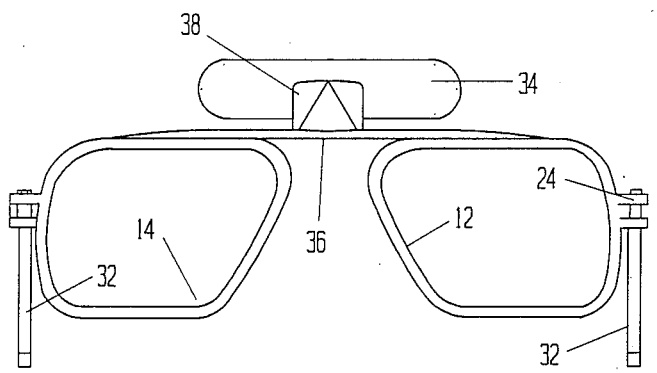
FIG. 2 is a front view of the eyeglasses of FIG. 1.

Referring now to FIGS. 1 and 2, the invention is shown as applied to an otherwise conventional binocular lens frame 10. The frame 10 includes a left ocular frame 12 and a right ocular frame 14 which can be of a wide variety of shapes and sizes. In most applications, however, each ocular frame has an upper rail 16 and a lower rail 18 and substantially vertical end rails 20 and 22. With plastic frames, these rails are often molded as a single member with a continuous groove about its inner wall to receive the peripheral edges of the lens. With metal frames, the ocular frame is usually split laterally with a compression joint secured with a fastening screw to compressively engage the frame about the lens.

Each of the ocular frames 12 and 14 laterally supports a hinge member 24 to which is pivotally secured the front end 26 of a respective temple 28. The temples are conventional, having substantially straight arms 30 extending rearwardly to inclined legs 32 which rest over and behind the ears of the wearer. Usually the legs 32 are covered, or are formed of soft plastic or rubber for comfort.

The present invention is applied to the aforementioned eyeglasses by providing a superstructure 34 which extends from the transverse bow 36 which joins the two ocular frames 12 and 14. The superstructure 34 can have a central support arm 38 which extends upwardly and rearwardly from a medial point 40 on the bow 36 or, alternatively, a support beam can extend upwardly and rearwardly from each of the ocular frames at a medial point on these frames.

The superstructure 34 has a transverse or horizontal support bar 42 located at its upper end 44. The bar 42 can be formed of a soft plastic or rubber, or one or more pads 46 can be secured to the bar 42, for wearing comfort. The support bar 42 is positioned upwardly and rearwardly from the cross bow 36 of the eyeglasses so that it will be located immediately above the brow of the wearer, resting on the wearer's forehead. This crossbar can be in various forms and can be a single bar, as illustrated, or, alternatively, can be a pair of support pads which are located immediately laterally of the midline of the glasses.

Figure 3:
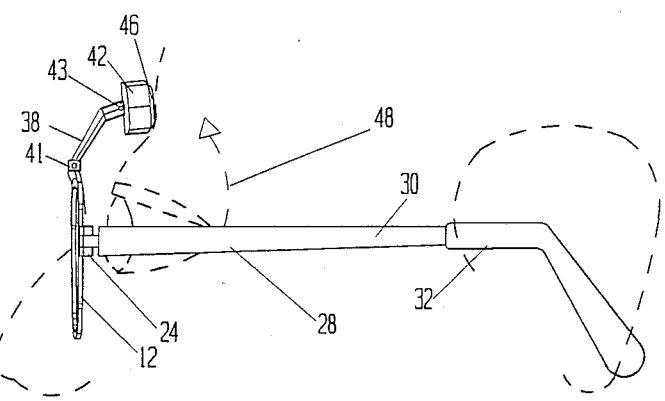
FIG. 3 illustrates the eyeglasses in position on a wearer.

Referring now to FIG. 3, the eyeglasses are shown in a wearing position. In the illustrated embodiment, the superstructure has a pivotal attachment; block 41 which has a pin that pivotally supports the arm 38, thereby permitting adjustment of the height and the inward position of the bar 42. Preferably the bar 42 is also pivotally supported on arm 38 by a pin 43 to provide adjustment capability of the frontal surface of pad 46 against the forehead of the wearer.

All persons have a brow of various degrees of prominence. The brow is formed by the bone of the skull which overlies the frontal sinuses. This brow is used by the invention as a very effective support for the eyeglasses. The bar 42 and pads 46 cannot slide past the brow for such a movement requires that the glasses rise upwardly sufficiently to permit the pad to pass over this supporting brow; see the arrowhead line 48.

In contrast, the customary nose bridge support for glasses is located on the bridge of the wearer's nose, below the elevation of the temples. As a result, the weight of the eyeglasses causes the eyeglasses to slide downwardly, passing over the bridge of the nose of the wearer. As this does not require any elevation of the eyeglasses, there are usually insufficient forces resisting the slight forward movement of the glasses necessary to clear the bridge of the nose of the wearer and, consequently, conventional eyeglasses have a tendency to slide downwardly.

The tendency of eyeglasses to slide downwardly is eliminated entirely with the frontal support of this invention.

Figure 4:
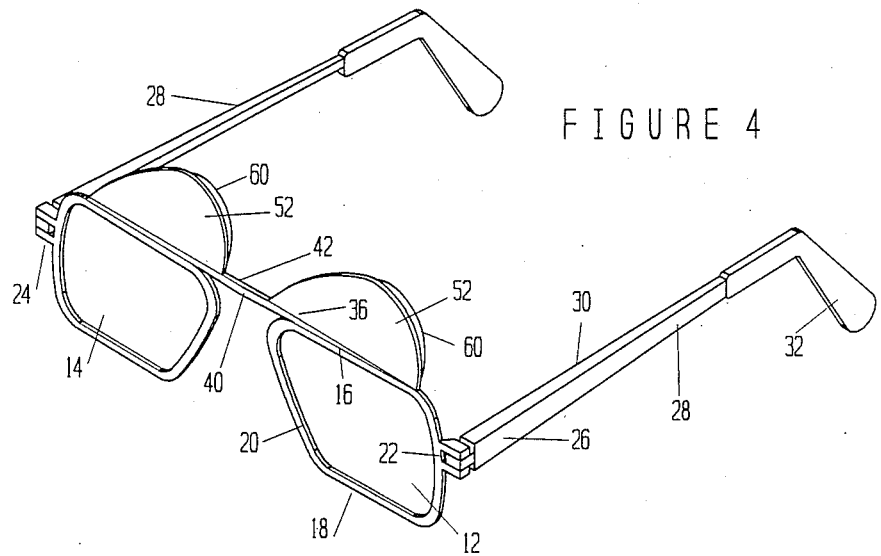
FIG. 4 is an alternative embodiment of the invention.

The invention can assume many forms and shapes. FIG. 4 illustrates a suitable shape in which the eyeglasses are supported by integral projections or wings 52 which extend from the upper edge of bar 42. The ocular frames each include an integral wing 56 which extends upwardly and rearwardly from the upper rail 58 of each ocular frame. In this application, the support pads 60 which are carried on the underside of the upper ends of the wings 52 rest on the respective left or right brow of the wearer, immediately over the left or right frontal sinus of the wearer.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. In an eyeglass structure having frame means interconnecting right and left ocular frames to support respective ocular lenses with upper frame edges and with laterally supported and pivotally attached temples, the improvement in a frontal support therefor which comprises:

a. at least one support post extending upwardly and rearwardly from said eyeglass structure; and b. a frontal support member carried on the upper end of said support post and constituting the only frontal support to carry the weight of said eyeglass structure and positioned symmetrically about the medium plane of said eyeglasses and above and behind the upper edges of the ocular frames of said eyeglass structure, to rest on the forehead and above the brow of a wearer of said eyeglasses and thereby support the weight of said eyeglass structure.

2. The eyeglass structure of claim 1 wherein said frontal support member is a single horizontally disposed bar that is centrally located from the medial point of said eyeglass structure.

3. The eyeglass structure of claim 2 wherein said means interconnecting said left and right ocular frames is a bow member joined at its opposite ends to said ocular frames and said support post is supported by said bow member.

4. The eyeglass structure of claim 1 wherein said frontal support member has right and left support contact pads, each of which is individually supported by a respective one of said right and left ocular frames by a respective support means projecting upwardly and rearwardly from the upper edge of its respective ocular frame.

5. The eyeglass structure of claim 4 wherein said support contact pads are right- and left-disposed wings, each of which is supported on the upper edge of its respective ocular frame and projects upwardly and rearwardly therefrom to rest on the forehead and above the brow of a wearer of said eyeglasses.

6. The eyeglass structure of claim 5 wherein said means interconnecting said left and right ocular frames is a bow member joined at its opposite ends to said ocular frames and said support post is supported by said bow member.

* * * * *